2 Sheets--Sheet 1.
T. CASTOR.
Street-Cars.
No. 6,058. Reissued Sept. 22, 1874.
FIG. I.
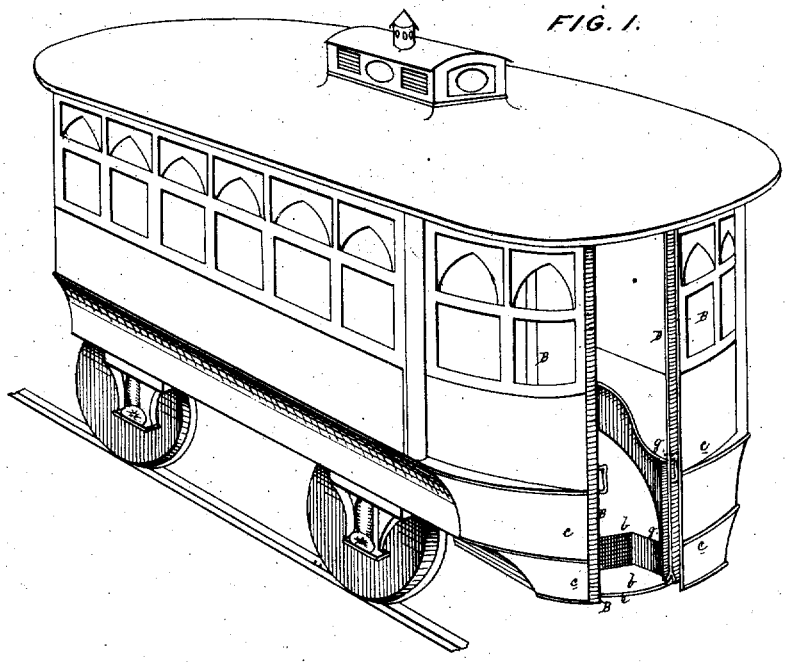
FIG. III.
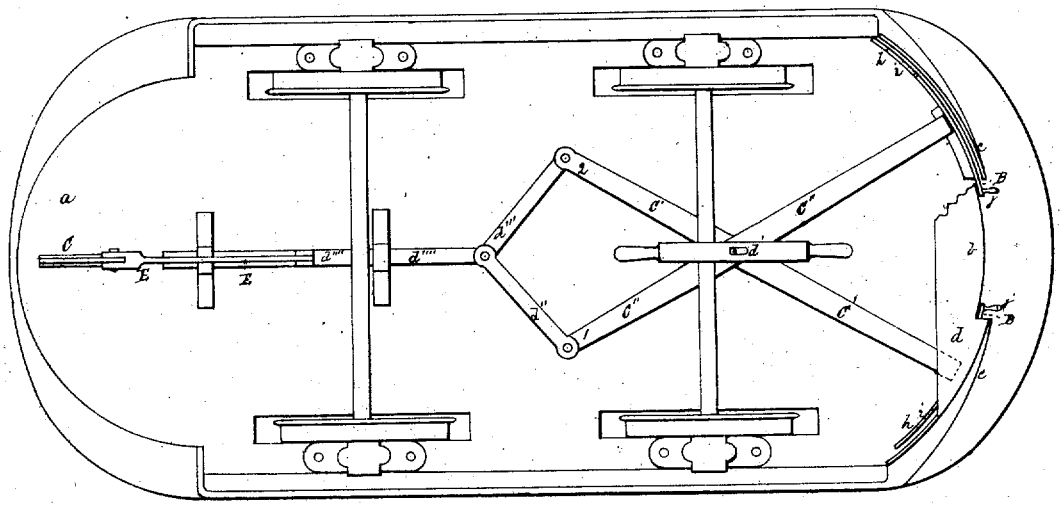
WITNESSES:
D. G. Stuart
J. J. Knight
INVENTOR:
Thos. Castor
per
S. Hannay
Atty.
THE GRAPHIC CO. PHOTO-LITH. 39 & 41 PARK PLACE, N.Y.

2 Sheets--Sheet 2.
T. CASTOR.
Street-Cars.
No. 6,058.
Reissued Sept. 22, 1874.
FIG. II.
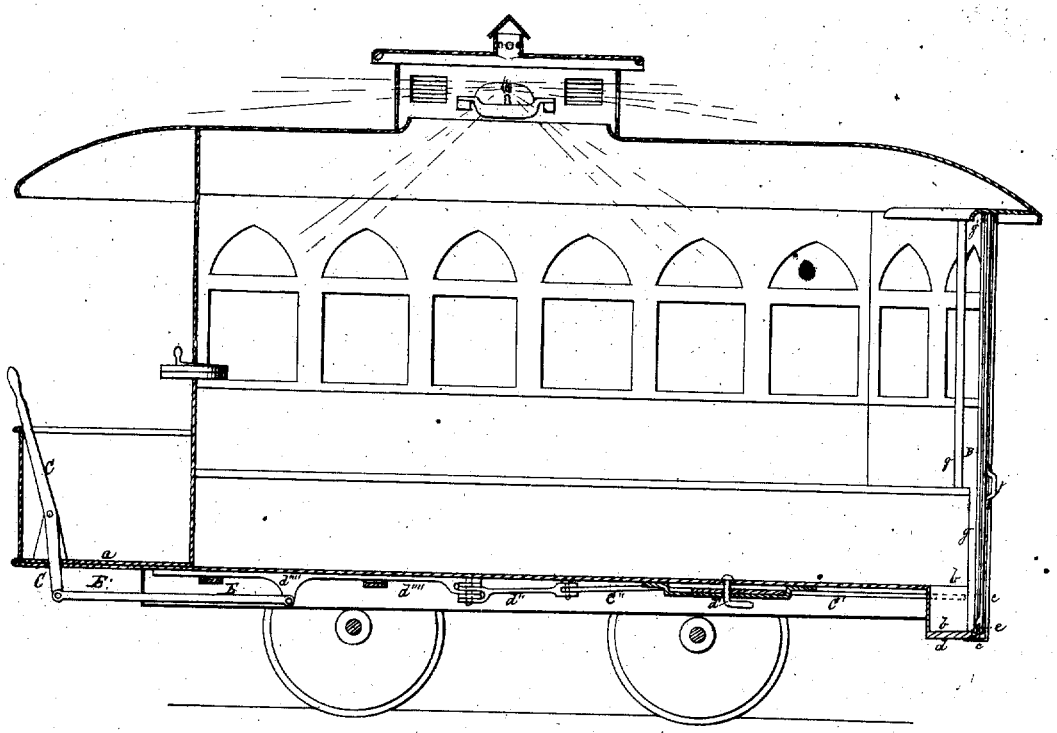
FIG. IV.
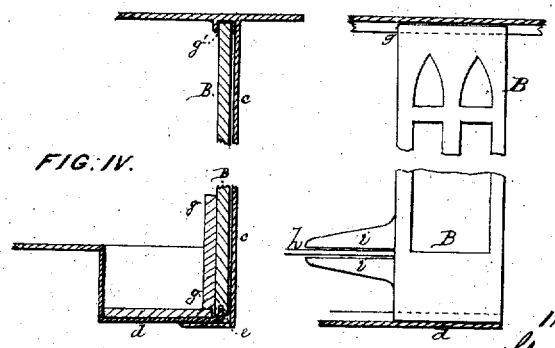
WITNESSES:
D. G. Stuart
I. Y. Knight
INVENTOR:
Thos Castor
per
S. Hannay
Atty.
THE GRAPHIC CO. PHOTO-LITH. 39 & 41 PARK PLACE, N.Y.

UNITED STATES PATENT OFFICE.

THOMAS CASTOR, OF PHILADELPHIA, PENNSYLVANIA, ASSIGNOR, BY MESNE ASSIGNMENTS, TO JOHN STEPHENSON, OF NEW YORK CITY.

IMPROVEMENT IN STREET-CARS.

Specification forming part of Letters Patent No. 32,681, dated July 2, 1861; reissue No. 6,058, dated September 22, 1874; application filed August 3, 1874.

DIVISION B.

*To all whom it may concern:*

Be it known that I, THOMAS CASTOR, of Philadelphia, in the State of Pennsylvania, have invented certain new and useful Improvements in the Construction of City Passenger Railway-Cars, of which the following is a description, reference being had to the accompanying drawings, making part of this specification, in which—

Figure 1 represents a view, in perspective, of a car having my improvements applied thereto; Fig. 2, vertical longitudinal section of the same; and Fig. 3, a plan of the bottom or under side of same; Fig. 4, sectional details of the bottom and top of the door and its adjuncts.

This division of my original patent relates solely to a new and improved mode of constructing the end of the car, with the view of combining therewith a sliding entrace door or doors, and mechanism for the driver to operate them.

To the use of a street-car provided with a hinged entrance-door in the rear there is serious objection, as much trouble is experienced by the passengers in making their exit from or entrance into the car at the street-crossings, especially when the door swings open toward the pavement from which the passengers desire to enter the car, or toward which they wish to move on leaving it.

To remedy this trouble, and to facilitate the opening and closing of the entrance by the driver, through suitable mechanism for the purpose, while at his post in front, are the objects of this branch of my invention.

The nature of my invention consists, first, in constructing the rear end of the car without a platform, and then providing it with a guide-frame and way of conformable shape for the support and guidance of a sliding door or doors; and secondly, in combining with a car thus made a sliding door, of suitable construction, to slide on the way in the guide-frame, and for attachment to and operation by mechanism placed under the control of the driver, through which he is enabled to open and close the entrance to the car at will.

To enable others skilled in the art to make, construct, and use my improvements, I will now proceed to describe them in detail, omitting a particular description of such parts of a car as are non-essential to a clear understanding of this branch of my invention.

My improvements are especially, but not exclusively, intended to be applied to cars having but a single driver's platform, *a*, such as those used on a continuous track, or in connection with turn-tables located at the ends of the track.

The car, for the purposes of this division of my improvements, may be made of any suitable shape—that is to say, either with square or round ends.

In the drawings the improvement is shown in connection with a car having a round rear end and square front end with rounded driver's platform, *a*.

The passenger-entrance to, and exit from, the car is arranged at the middle of the curved end in the rear, suitable steps, *b*, being arranged therein to facilitate their entrance.

By reference to the drawings, it will be seen that no platform is affixed to that end, and that the outer edge of the lower step is flush, or nearly so, with the line of its outer wall.

To the lower ends of the walls *c*, which depend below the floor of the car and inclose the ends of the steps, is secured a stout transverse supporting-beam, *d*, on the outer edge of which is secured a rail or way, *e*, for the support of the sliding door or doors B B. This way is arranged in a plane below the line of the floor of the car, and so as to run on the outer edge of the lower step.

The outer wall *c* of the rear end of the car is also extended down to the supporting-beam, and, if desired, may be secured thereto in any known manner; or the rail *e* may form an upturned edge of the supporting-beam, if the latter is made of a metal plate.

On each side of the entrance-door, on the inside of the car, is arranged a guide-frame, *g*, at a suitable distance apart from the outer walls, to form a channel or recess for the doors within which to slide when opened or shut.

This frame may be secured to the floor and body of the car in any suitable and known manner.

To the under side of the rear end of the floor are secured guide-plates *h*, one on each side of the car, for a purpose hereafter to be described. Immediately under the roof of the car, on the inside, is formed another guide groove or recess, *g'*, for the upper end of the doors to slide in.

The rear end of the car shown in the drawing being circularly formed, the guideway, sliding doors, and rails are made conformable therewith.

In order to make the doors slide smooth and easy, their rear sides are provided with two guide-arms, *i*, which, being turned slightly in toward the interior of the car, embrace the edge of the guide-plates *h* before mentioned.

This device tends to prevent the ends of the doors from tipping, and to cause them to slide freely out and in as required.

Each door is provided with a handle, *j*, on the outside, by which the passengers may slide them back in order to enter the car, but not to go out. In addition to this a device is attached to the lower end of the doors, through which and suitable connections for the purpose the driver, while at his post in front, can open or close the entrance at will, and thereby control the exit as well the entrance way to the car.

The devices I employ for this purpose consist of a system of levers, *c'*, *c''*, *d''*, *d'''*, *d''''*, E, and C, the latter extending up through the bottom of the front platform of the car within easy reach of the driver, and which being suitably pivoted enables the driver, by moving it toward or from the end of the car, to open or close the door, according to the direction in which he moves it.

By reference to Fig. 3, in which the connection and relation of the various levers to each other are shown, the operation will be apparent, as, by moving the handle of lever *c* toward the car, the ends 1 and 2 of levers *c'* and *c''* will be drawn together by means of the lever E and link-rods *d''''*, *d'''*, and *d''*, and thus close the doors.

The reverse operation will, of course, open the doors.

It will also be apparent that the doors will slide more readily when curved and made to slide in a circular way, but such is not essential.

If a square end is used, the levers *c'* and *c''* should be connected with the doors by means of a link-rod; or, instead of the system of levers herein described for operating the door or doors, the lever C upon the front of the platform may be connected with the doors by any known combination of levers which will give the desired motion.

It will also be apparent that by covering the entrance to the car with two doors instead of one, the opening and closing of the doors by mechanism, under the control of the driver for that purpose, will be much facilitated, as it will require but half the motion to accomplish it.

Again, by making the car without a platform in the rear and arranging the steps that lead to the interior or the inside, and then covering them, by extending the door or doors down for the purpose, accidents will be prevented, and no one be allowed to get in or out of the car, so as to ride surreptitiously without the knowledge of the driver.

Having thus described my improvement, what I claim as my invention, and desire to secure by Letters Patent, is—

1. The combination of a street-car body and rear-entrance sliding door or doors, substantially as and for the purpose set forth.

2. The combination of a street-car body with a supporting-rail, *e*, and rear-entrance sliding door or doors, of conformable shape, substantially as and for the purpose set forth.

3. The combination of a street-car body with a supporting-rail, *e*, and rear-entrance sliding door or doors, of conformable shape, the door or doors, or an attachment thereto, being extended downward to a point below the plane of the bottom of the car, for convenience of connection with devices for operating the door or doors, substantially as set forth.

4. The combination of a street-car body having a platformless rear with a rear-entrance sliding door or doors, and supporting-rail *e*, of conformable shape, the door or doors being extended down so as to inclose the rear-entrance steps, substantially as and for the purposes set forth.

5. The combination of a street-car body with rear-entrance sliding door or doors inclosing the rear-entrance steps, and forming the point of connection for the devices through which to be operated from the front end of the car, substantially as set forth.

6. The combination of a street-car body having a platformless rear, with a rear-entrance sliding door or doors, substantially as and for the purposes set forth.

7. The combination of a street-car body having a platformless rear, with a rear-entrance sliding door or doors, and supporting-rail *e*, the door or doors, or an attachment thereto, being extended downward to form a point of connection for the devices by which to be operated, substantially as set forth.

8. The combination of a street-car body, rear-entrance sliding door or doors, and the supporting-rail *e*, with guiding and steadying devices respectively applied to the door or doors and car-body, to prevent tilting or jamming of the door or doors, substantially as set forth.

THOS. CASTOR.

Witnesses:
WM. HALL WAXLER,
DANIEL R. HART.